(12) United States Patent
Reiners et al.

(10) Patent No.: US 7,762,699 B2
(45) Date of Patent: Jul. 27, 2010

(54) MOTOR VEHICLE HEADLIGHT

(75) Inventors: Thomas Reiners, Bachhagel (DE); Ralf Vollmer, Heidenheim (DE); Alexander Wilm, Regensburg (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 0 days.

(21) Appl. No.: 11/887,723

(22) PCT Filed: Mar. 31, 2006

(86) PCT No.: PCT/DE2006/000573

§ 371 (c)(1),
(2), (4) Date: Apr. 21, 2008

(87) PCT Pub. No.: WO2006/102882

PCT Pub. Date: Oct. 5, 2006

(65) Prior Publication Data

US 2009/0080210 A1   Mar. 26, 2009

(30) Foreign Application Priority Data

Mar. 31, 2005   (DE) .................. 10 2005 014 754

(51) Int. Cl.
*F21V 7/06* (2006.01)

(52) U.S. Cl. .................. 362/545; 362/543; 362/523; 362/509

(58) Field of Classification Search .................. 362/509, 362/522, 545, 523–525
See application file for complete search history.

(56) References Cited

U.S. PATENT DOCUMENTS

| 6,601,982 | B1 | 8/2003 | Begemann et al. |
| 7,503,679 | B2 * | 3/2009 | Godbillon .................. 362/522 |
| 7,540,638 | B2 * | 6/2009 | Dassanayake et al. ....... 362/465 |
| 7,585,096 | B2 * | 9/2009 | Fallahi et al. ............... 362/517 |
| 2004/0246739 | A1 | 12/2004 | Gebauer |
| 2007/0263402 | A1 * | 11/2007 | de Lamberterie ........... 362/509 |

FOREIGN PATENT DOCUMENTS

| CN | 2627351 | 7/2004 |
| CN | 1590834 | 3/2005 |
| DE | 198 03 987 | 8/1998 |
| WO | WO 2004/088200 | 10/2004 |

* cited by examiner

*Primary Examiner*—Anabel M Ton
(74) *Attorney, Agent, or Firm*—Cohen Pontani Lieberman & Pavane LLP

(57) ABSTRACT

A motor vehicle headlight (80) comprises at least two modules (70) for light production, the radiation characteristics of at least one of the modules (70) being adjustable in a reference system associated with the headlight. Preferably, modules (70) of the headlight (80) have different radiation characteristics and the irradiation characteristics of at least two of the modules (70) overlap to form an adjustable radiation characteristic of the headlight (80).

12 Claims, 11 Drawing Sheets

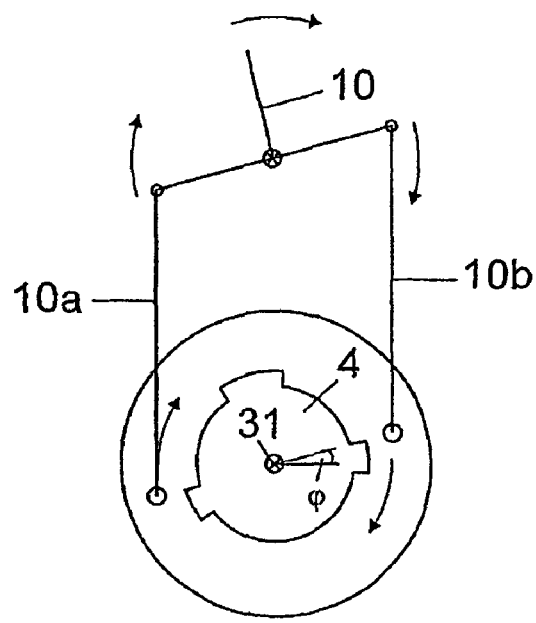
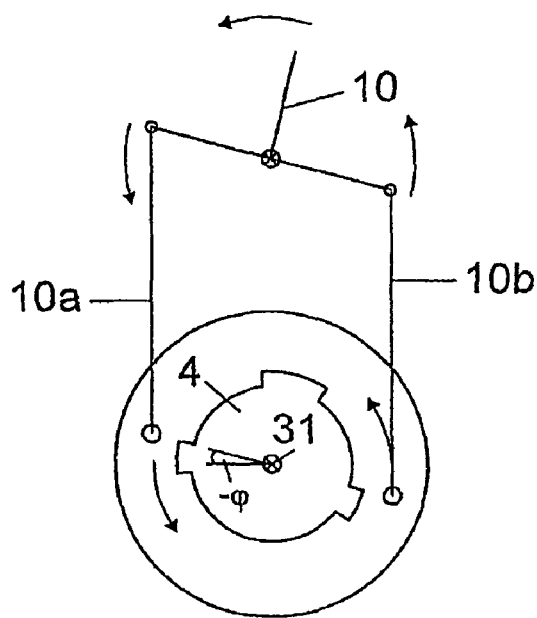
FIG 8A　　　　　　FIG 8B
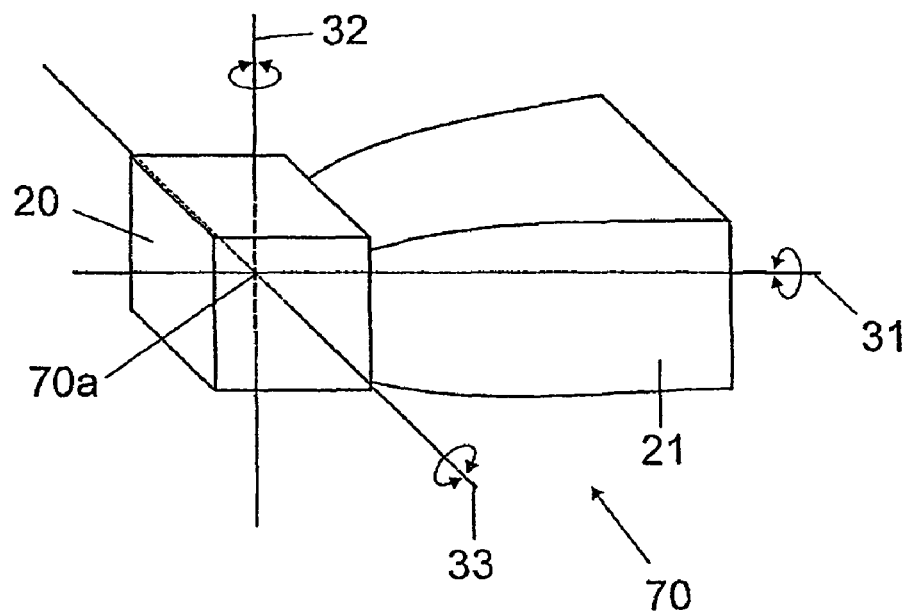
FIG 9

MOTOR VEHICLE HEADLIGHT

RELATED APPLICATIONS

This is a U.S. national stage of application No. PCT/DE2006/00573, filed on 31 Mar. 2006.

This patent application claims the priority of German patent application no. 10 2005 014 754.2 filed 31 Mar. 2005, the disclosure content of which is hereby incorporated by reference.

FIELD OF THE INVENTION

The invention specifies a motor vehicle headlamp.

BACKGROUND OF THE INVENTION

The document U.S. Pat. No. 6,601,982 B2 describes a motor vehicle headlamp.

SUMMARY OF THE INVENTION

An object of the present invention is to provide a motor vehicle headlamp having a particularly long life. A further object is to provide a motor vehicle headlamp which is particularly versatile in use. Another object is to provide a motor vehicle headlamp having a particularly variable emission characteristic.

In accordance with at least one embodiment, the motor vehicle headlamp has at least two modules for light generation. That is to say the motor vehicle headlamp contains at least two component parts suitable for light generation. The modules may be, for example, individual light sources or else light sources which have optical elements arranged downstream of them.

Preferably, each of the modules for light generation has an emission characteristic. The emission characteristic of a module is in this case to be understood as being the spatial intensity or brightness distribution of the light emitted by the module. For example, a module may have a conical emission characteristic. This then means that areas having the same intensity or brightness of the light emitted by the module form a cone in three dimensions. Furthermore, many other forms of the emission characteristic of a module are possible.

In accordance with at least one embodiment of the motor vehicle headlamp, the emission characteristic of at least one of the modules is capable of moving in a reference system associated with the headlamp. A reference system associated with the headlamp is understood to mean a reference system which is fixedly connected to the headlamp. Parts of the headlamp, such as a headlamp housing, for example, are fixed in position in this reference system. In the case of a motor vehicle headlamp, the reference system can, for example, also be fixedly connected to the bodywork of the motor vehicle.

The emission characteristic of the module is capable of moving in the reference system associated with the headlamp. Preferably, the emission characteristic of the module is capable of being displaced and/or rotated, for example, in this reference system.

Capable of moving is intended, in particular, to mean that the emission characteristic of the module can be moved in a predeterminable manner. The emission characteristic of the module can therefore be matched in a targeted manner to the use requirements of the headlamp. This can take place even during a movement of the entire headlamp, for example, when a motor vehicle is traveling. Owing to the movement of the emission characteristic of the module, it is therefore possible to respond to a specific traffic situation, for example.

In accordance with at least one embodiment of the motor vehicle headlamp, the motor vehicle headlamp has at least two modules for light generation, the emission characteristic of at least one of the modules being capable of moving in a reference system associated with the headlamp.

In accordance with at least one embodiment of the motor vehicle headlamp, modules of the motor vehicle headlamp have different emission characteristics than one another. That is to say, at least two modules of the headlamp are suitable for generating light with different emission characteristics than one another. The modules having different emission characteristics are provided, for example, for different traffic situations and driving conditions. Thus a module can have a particularly narrow emission characteristic, in which light is concentrated on a relatively small angular range in three dimensions. Another module can have a broader emission characteristic in comparison with this, in which a larger angular range in three dimensions is illuminated. Furthermore, the headlamp can have further modules having different emission characteristics or a plurality of modules having in each case the same emission characteristic.

In accordance with at least one embodiment of the motor vehicle headlamp, the emission characteristics of at least two of the modules are superimposed to give a common emission The motor vehicle headlamp in this case makes use of the idea, inter alia, that, owing to the use of relatively fewer modules owing to the superimposition of the emission characteristics of the modules, the headlamp can be matched to a large number of different traffic and driving situations. Owing to the movement and dimming of the emission characteristics of the individual modules and the operation of different modules and the super-imposition of the emission characteristics of different modules, an emission characteristic of the headlamp which is matched to the situation can be modeled.

Thus, the emission characteristic of the headlamp can be matched, for example, to the weather conditions, the surrounding environment (town, country road, highway), the lighting conditions, changes in direction of the motor vehicle, and/or the inclination of the motor vehicle. In addition, it is also possible to match the emission characteristic to whether the vehicle is being operated in traffic on the right or left.

In accordance with at least one embodiment, a module of the headlamp has a light source and a module optical unit. Preferably, each module of the headlamp has a light source and a module optical unit. The module optical unit is, for example, connected to the light source in such a way that it is fixed in position.

The module optical unit is preferably arranged downstream of the light source in such a way that at least a large proportion of the light emitted by the light source passes through the module optical unit. At least part of the light passing through is optically influenced by the module optical unit. The module optical unit may be, for example, light-reflecting optical elements, light-refracting optical elements or a combination of these optical elements.

Preferably, the module optical unit is suitable for reducing the divergence of the light entering the module optical unit as it passes through the optical unit. That is to say the light emitted by the light source is influenced, for example, as it passes through the module optical unit in such a way that its divergence is smaller after it has emerged from the module optical unit than before it has entered the module optical unit. Particularly preferably, the module optical unit is furthermore suitable for bringing about a predeterminable light distribution of the emerging light.

In at least one embodiment of the motor vehicle headlamp, the module optical unit is shaped for this purpose in the form of a non-imaging optical concentrator. In this case, the light source is arranged on the actual light exit surface of the optical concentrator. From there, light from the light source can be coupled into the concentrator, with the result that the optical concentrator has radiation passing through it in the opposite direction.

The module optical unit preferably has side surfaces, which connect the light entry surface of the module optical unit on which the light source is arranged to the light exit surface. Preferably, the light entry surface has a smaller area than the light exit surface. At least some of the light coupled in through the light entry surface is reflected on the side surfaces and in this way passed to the light exit surface. The shape of the side surfaces can in this case be selected such that a desired light density distribution results on the light exit surface or in a plane running parallel to the light exit surface. That is, light emerges at the light exit surface in such a way that it is not homogeneously distributed over the entire light exit surface, but there are regions of the light exit surface in which the light density is greater than in other regions of the light exit surface. In this way it is possible to modulate a desired emission characteristic of the module. Thus, a particularly bright region, for example, can be defined even on the light exit surface of the module, as well as a markedly pronounced light/dark transition.

In accordance with at least one embodiment of the motor vehicle headlamp, the module optical unit of a module can be formed, at least in places, as at least one of the following optical elements: compound parabolic concentrator (CPC), compound elliptic concentrator (CEC), compound hyperbolic concentrator (CHC). That is to say, the side surfaces of the module optical unit are shaped, at least in places, in the manner of one of these optical elements.

It is further possible for the module optical unit to have, at least in places, planar side surfaces or side surfaces of a body of rotation. In this way, the module optical unit can be shaped, at least in places, in the manner of a truncated-pyramid or truncated-cone optical unit.

In addition, the side surfaces of the module optical unit may contain freeform surfaces, for example with higher-order curvatures.

In accordance with at least one embodiment of the motor vehicle headlamp, the light source of a module contains at least one light-emitting diode chip. Preferably, the light source contains a plurality of light-emitting diode chips. The light source is further preferably suitable for emitting light which appears white to the viewer.

In case of doubt, the IEC definition of "white" should be used here.

That is to say, the light source contains, for example, light-emitting diode chips, whose emitted light is mixed to give white light. It is further possible for a luminescence conversion material to be arranged downstream of the light-emitting diode chips of the light source. At least some of the electromagnetic radiation emitted by the light-emitting diode chips is converted by the luminescence conversion material to light of another wavelength. The unconverted proportion of the light emitted by the light-emitting diode and the frequency-converted proportion are mixed then to form white light.

Preferably, any light-emitting diode chip is suitable for generating a luminous flux of at least 20 lm during continuous operation. For example, the light source contains at least four light-emitting diode chips of this type, with the result that any module is suitable for generating a luminous flux of at least 100 lm during continuous operation.

In accordance with at least one embodiment, the radiation inlet opening of the module optical unit has a cross-sectional area which is a maximum of two times as great as the total radiation output surface are of the light-emitting diode chips associated with the module. The total radiation output surface area is provided by the sum of the radiation output surface areas of the individual light-emitting diode chips associated with the module. Preferably, the area of the light inlet opening is a maximum of 1.5, particularly preferably a maximum of 1.25, times as great as the total radiation output surface area of the light-emitting diode chips associated with the module.

Such a small light entry surface makes it possible to reduce the solid angle in which the light is emitted as close as possible to the radiation output surface of the light-emitting diode chips. There, the cross-sectional area of the beam cones emitted by the light-emitting diode chips is particularly small. This allows for construction of component parts with an optimized etendue value. That is to say a radiation intensity which is as high as possible is projected onto a surface which is as small as possible.

In accordance with at least one embodiment of the motor vehicle headlamp, at least parts of a module of the motor vehicle headlamp are capable of moving in the reference system associated with the headlamp. This makes it possible to achieve a situation in which the emission characteristic of the module is capable of moving in the reference system of the headlamp.

The movement of the module in the reference system of the headlamp can comprise translations and rotations of the module. In the reference system of the headlamp, in this case means, as has already been mentioned above, that a movement takes place in relation to a part of the headlamp which is fixed in position in a reference system associated with the headlamp. For example, the module is therefore capable of moving in relation to the housing of the headlamp or in relation to the bodywork of the motor vehicle in which the headlamp is located.

In accordance with at least one embodiment of the motor vehicle headlamp, the module is mounted such that it is capable of rotating. That is to say the module can be rotated about at least one axis, which runs, for example, through the module. Owing to the rotation of the module, a movement of the emission characteristic of the module in the reference system of the headlamp takes place.

In accordance with at least one embodiment of the motor vehicle headlamp, the module is mounted such that it is capable of rotating about three associated main axes. In this case, the three main axes run at right angles to one another and intersect one another, for example, at one point on the module. Preferably, one of the main axes—the longitudinal axis of the module—runs parallel to the main emission direction of the module, i.e. parallel to the direction in which light passes through the light exit surface of the module optical unit with the greatest intensity.

In accordance with at least one embodiment of the motor vehicle headlamp, the position of the module optical unit in relation to the light source can be changed. For example, the module optical unit can be capable of being displaced or rotated in relation to the light source. In this way, too, a movement of the emission characteristic of the module is possible.

In accordance with at least one embodiment, the headlamp has a stepper motor. The stepper motor is suitable for moving the emission characteristic of the module in a defined manner. The stepper motor can be provided both for rotating the emission characteristic through angles which can be set and for displacing the emission characteristic by predetermined distances in the reference system associated with the headlamp. For example, a stepper motor can be provided in order to rotate a module of the headlamp about an axis. It is further possible, possibly using an additional stepper motor, to rotate the module optical unit in relation to the light source of the module. In this case, the stepper motor allows for a predetetminable angle of rotation to be approached in a plurality of steps if the angle of rotation is a multiple of the minimum angle of rotation of the stepper motor. Preferably, the minimum angle of rotation of the stepper motor is at most 1°.

It is furthermore possible for a plurality of stepper motors for rotation about different axes to be associated with each module of the headlamp.

In accordance with at least one embodiment of the motor vehicle headlamp, the headlamp contains a lever system. The lever system is suitable for moving the emission characteristic of the module in a defined manner. By means of the lever system, rotation and translation of the emission characteristic in relation to a reference system associated with the headlamp can be brought about. For example, by means of a lever system the module or the module optical unit can be rotated in relation to the light source.

In accordance with at least one embodiment of the headlamp, the motor vehicle headlamp has an optical element arranged downstream of the module. For example, a common optical element can be arranged downstream of all the modules. Preferably, the optical element is arranged downstream of the modules in such a way that at least some of the light emitted by the modules passes through the optical element and is influenced by it.

Preferably, the optical element comprises a projection lens. Particularly preferably, the light exit surface of at least one of the modules is in the focal plane of the projection lens. In this way, the light density distribution on or at the light exit surface of the module optical unit can be imaged particularly sharply on the surface to be illuminated.

In accordance with at least one embodiment, the position of at least one of the modules of the headlamp can be changed in relation to the projection lens. In this way, for example, the radiation exit surface of the module or parts of the radiation exit surface of the module can be moved out of or into the focal plane of the projection lens. As a result, it is possible, for example, to set a light/dark transition in the projection of the light density distribution so as to correspond to regulations by law and/or design requirements. This makes it possible further to match the emission characteristic of the module to the traffic situation and the driving conditions.

In the text which follows, the motor vehicle headlamp described here will be explained in more detail with reference to exemplary embodiments and the associated figures. In the exemplary embodiments and figures, identical or functionally identical parts have each been provided with the same reference symbols. The elements illustrated cannot be regarded as being true to scale, but instead individual elements may be illustrated as being excessively large for reasons of better understanding.

BRIEF DESCRIPTION OF THE DRAWINGS

FIGS. 8A and 8B show a lever system for rotating a module about the longitudinal axis.

FIG. 9 shows a schematic, perspective diagram of a module.

DETAILED DESCRIPTION OF THE DRAWINGS

FIGS. 1 to 4 show the light intensity distribution of various exemplary embodiments of the modules for light generation. The light intensity distribution results, for example, by a test screen being illuminated by light emitted by the modules.

The test screen is located, for example, at a great distance in front of the headlamp in which the module is integrated. The plane of the test screen runs at right angles to the optical axis 61 of a projection lens 60 arranged downstream of the modules (cf. in this regard FIG. 13). That is to say the light intensity distribution shown is a planar projection of the emission characteristic of the respective module or of the superimposition of the emission characteristics of the respective modules in the far field. This means that the distance between the headlamp and the test screen is larger than the dimensions of the headlamp. The x and y axes of FIGS. 1 to 7 give, in arbitrary units, the extent of the light intensity distribution in the horizontal and vertical direction, respectively. The dividing line 12 at x=0 separates the traffic directions from one another. That is to say, in the case of traffic on the right, the side of the oncoming traffic is to the left of the dividing line 12 when viewed from the module in the direction of the test screen.

Figure 1:
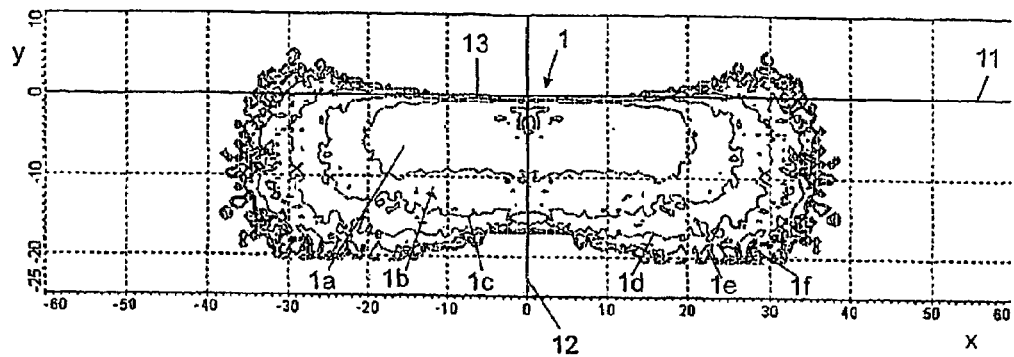
FIG. 1 shows, schematically, the light intensity distribution of the projection of the emission characteristic of a module in accordance with a first exemplary embodiment.

FIG. 1 shows, schematically, the light intensity distribution of a first module 1 for light generation as results from the projection of the emission characteristic of the module 1 onto the test screen. The contours in FIG. 1 are curves of constant light intensity and delimit regions (1a to 1f) of different light intensity. The maximum light intensity in this exemplary embodiment is approximately 3500 cd. In region 1a, the light intensity is at least 3000 cd, in region 1b at least 1000 cd, in region 1c at least 300 cd, in region 1d at least 100 cd, in region 1e at least 30 cd and in region 1f at least 10 cd. That is to say the light intensity decreases from the center at x=0 to the edges of the light intensity distribution. A light/dark transition 13 extends at least in places along the horizontal line 11 which is fixed arbitrarily at y=0. In comparison with the luminous intensity distribution of the modules in FIGS. 2 to 4, the module 1 in FIG. 1 shows a broad, relatively diffuse luminous intensity distribution as a result of a relatively broad, diffuse emission characteristic. Such a module 1 can be used, for example, as the basic module for a lower beam setting of the motor vehicle headlamp. This means that the emission characteristic of the module 1 is particularly suitable for a relatively well illuminated environment at a relatively low speed of a vehicle. That is to say, for example, that the area in front of the vehicle, i.e. relatively close to the vehicle, is illuminated particularly well.

Figure 2:
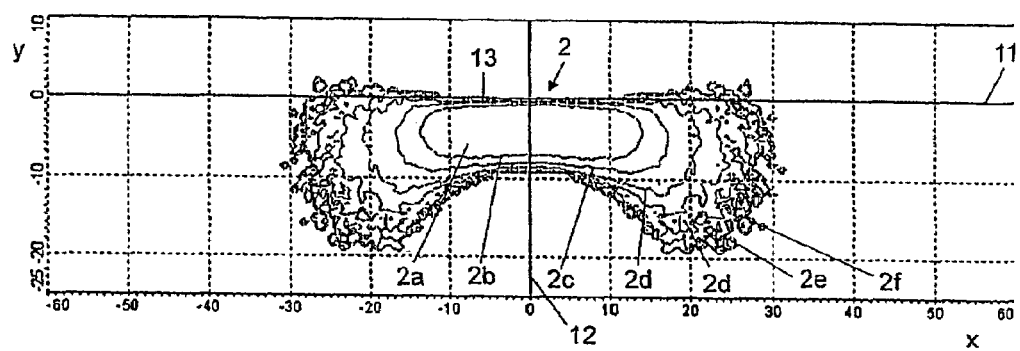
FIG. 2 shows, schematically, the light intensity distribution of the projection of the emission characteristic of a module in accordance with a second exemplary embodiment.

FIG. 2 shows, schematically, the luminous intensity distribution of a second module 2 for light generation. The maximum luminous intensity in this exemplary embodiment is approximately 8000 cd. The division of regions 2a to 2f by the contours correspond to the division in FIG. 1. In comparison with the module in FIG. 1, FIG. 2 shows a less broad luminous intensity distribution. That is to say that the luminous intensity in this case falls to values below 10 cd in the case of smaller x values or y values. Furthermore, the light intensity is more concentrated in the center of the light intensity distribution (at x=0, y=−5). This means that the region with the greatest illumination 2a assumes a smaller area. The module 2 shows, therefore, an emission characteristic which, in comparison with the emission characteristic of the module in FIG. 1, is more concentrated and less diffuse. Module 2 can be used, for example, as a basic module for a lower beam.

Figure 3:
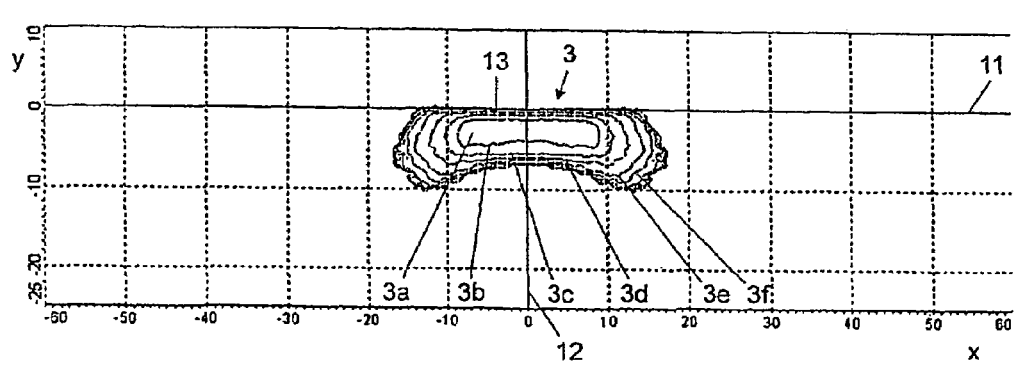
FIG. 3 shows, schematically, the light intensity distribution of the projection of the emission characteristic of a module in accordance with a third exemplary embodiment.

FIG. 3 shows, schematically, the luminous intensity distribution of a third module 3 for light generation. Region 3a denotes the area with the greatest light intensity with a light intensity of at least 10 000 cd. The maximum light intensity in the exemplary embodiment in FIG. 3 is approximately 16 000 cd. The areas 3a to 3f of the light intensity distribution adjoin one another with light intensities of at least 3000 cd (area 3b), to at least 30 cd (area 3f). In comparison with the emission characteristic of the module in FIG. 2, module 3 shows a further concentration of the light intensity. Module 3 can be used as a basic module for an upper beam.

Figure 4A:
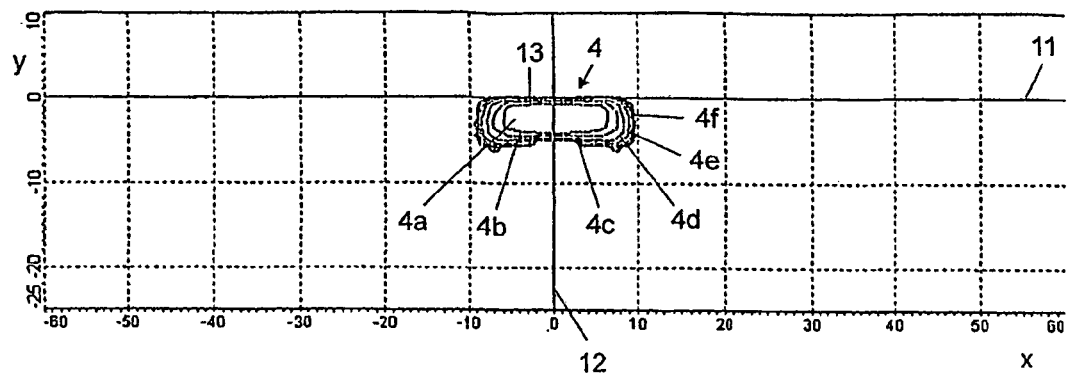
FIG. 4A shows, schematically, the light intensity distribution of the projection of the emission characteristic of a module in accordance with a fourth exemplary embodiment.

FIG. 4A shows a schematic light intensity distribution of a fourth module for light generation. The region 4a denotes the region with the greatest light intensity with a light intensity of at least 10 000 cd. The maximum light intensity is approximately 21 000 cd. The further division of the light intensity into the regions 4b to 4f corresponds to the division in FIG. 3. Module 4 has a particularly concentrated emission characteristic. Module 4 is therefore preferably used as a so-called hot spot module 4 for different operating settings of the headlamp.

Figure 4B:
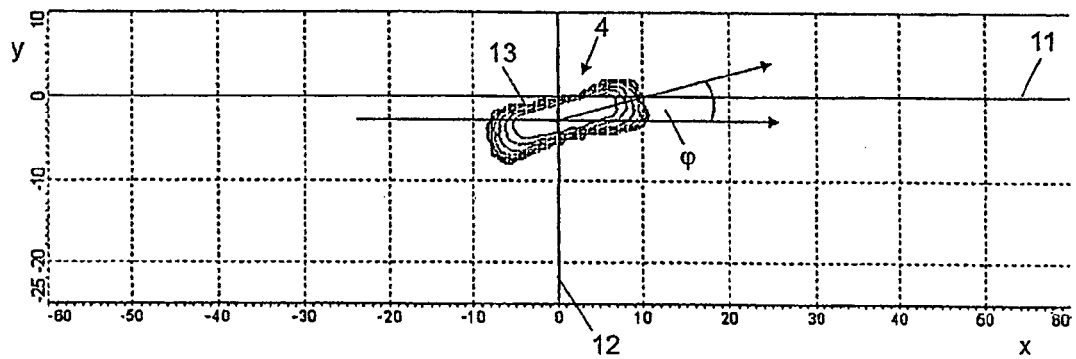
FIG. 4B shows the projection of an emission characteristic, rotated about the longitudinal axis, of the module in accordance with the fourth exemplary embodiment.
Figure 4C:
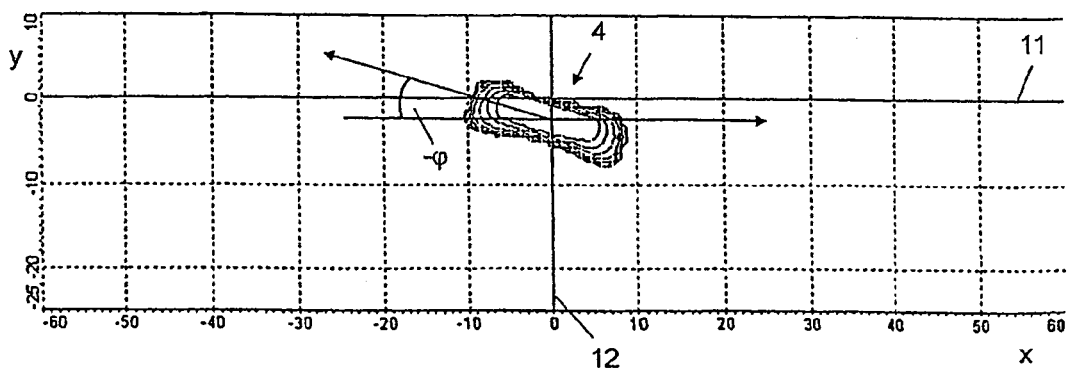
FIG. 4C shows the projection of an emission characteristic, rotated about the longitudinal axis, of the module in accordance with the fourth exemplary embodiment.

Preferably, as illustrated in FIGS. 4B and 4C, the emission characteristic of the module 4 can be rotated about a longitudinal axis 31 of the module (see in this regard also FIG. 9). The rotation of the emission characteristic can take place, for example, by means of the entire module being rotated about its longitudinal axis 31. FIG. 4B shows a rotation of the emission characteristic through an angle +φ, FIG. 4C shows a rotation through an angle −φ. For example, the angle φ in this case can be, for example, 15°.

Figure 5A:
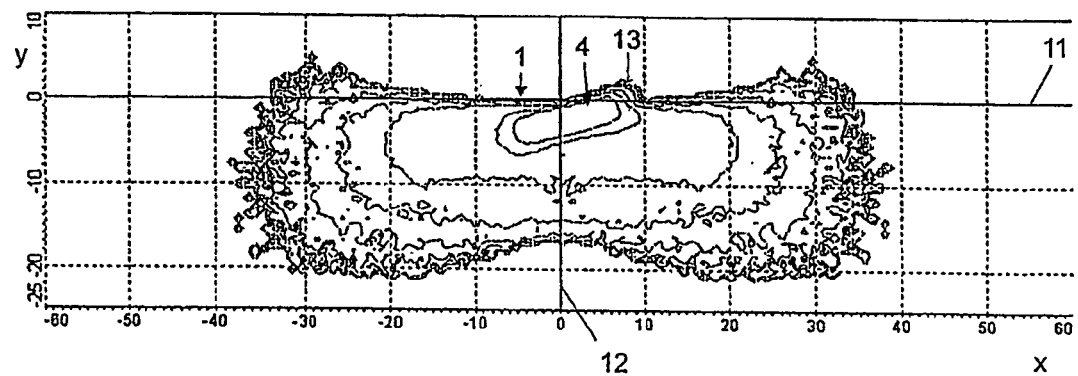
FIG. 5A shows, schematically, the light intensity distribution of a superimposition of the emission characteristics of the modules in accordance with the first and fourth exemplary embodiments.

FIG. 5A shows, schematically, the light intensity distribution of a superimposition of the emission characteristics of the modules 1 and 4. That is to say, the modules 1 and 4 appear to the viewer to be emitting light at the same time. Their emission characteristics are superimposed on one another. This results on a test screen in the shown light intensity distribution, which represents a three-dimensional addition of the light intensity distributions of the modules 1 and 4.

In the exemplary embodiment in FIG. 5A, the emission characteristic of the hot spot module 4 is rotated through +15°, for example. As a result, the emission characteristic of the module 4 is superimposed on the emission characteristic of the module 1 in such a way that, in the case of traffic on the right, a horizontal line of the light/dark transition 13 remains on the side of the oncoming traffic (to the left of the dividing line 12). On the traffic side (to the right of the dividing line 12), the light/dark transition 13 runs at an angle of φ=15° with respect to the horizontal.

This means, in summary, that an asymmetrical contribution to the light distribution, such as the emission characteristic of the module 4, is set by means of rotation of the emission characteristic in relation to a longitudinal axis 31 of the module. The superimposition of the concentrated emission characteristic of the hot spot module 4 with the broad, diffuse emission characteristic of the module 1 can be used in particular for a lower beam operating mode of the headlamp.

Figure 5B:
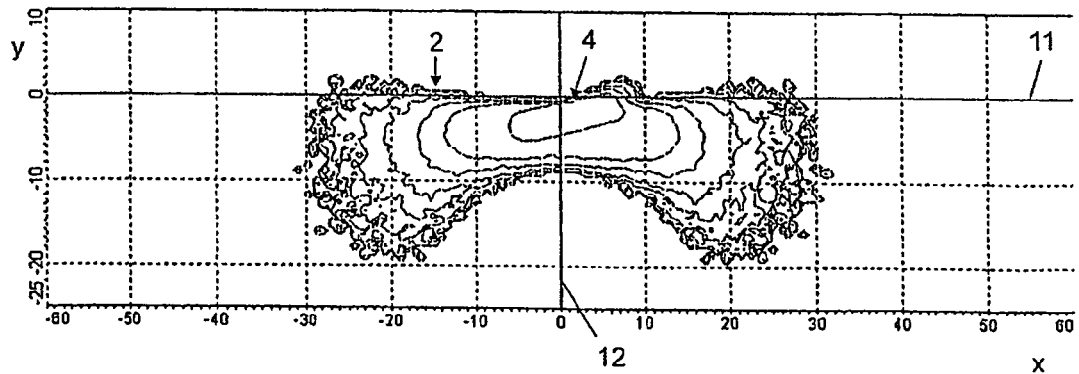
FIG. 5B shows, schematically, the light intensity distribution of a superimposition of the emission characteristics of the modules in accordance with the second and fourth exemplary embodiments.

FIG. 5B shows, schematically, the light intensity distribution of a superimposition of the emission characteristics of the modules 2 and 4. In this exemplary embodiment as well, the emission characteristic of the hot spot module 4 is rotated through an angle φ with respect to the horizontal 11. An emission characteristic modeled in such a way can be used, for example, as a lower beam.

Figure 5C:
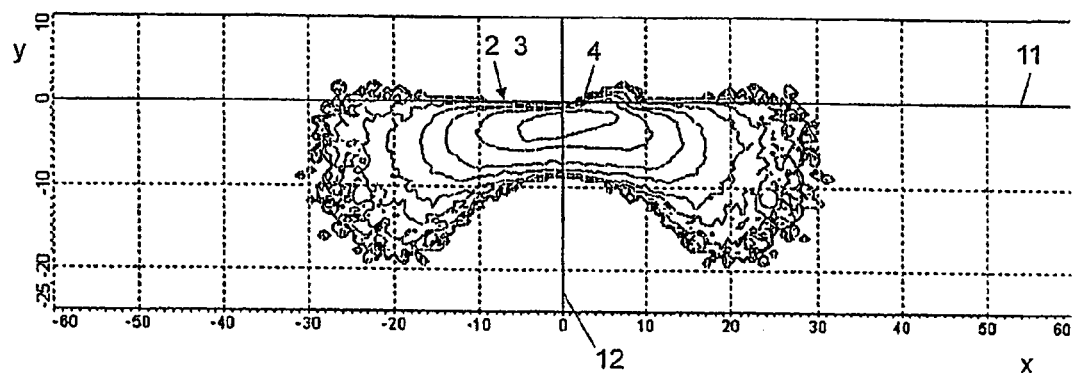
FIG. 5C shows, schematically, the light intensity distribution of a superimposition of the emission characteristics of the modules in accordance with the second, third and fourth exemplary embodiments.

FIG. 5C shows the superimposition of the emission characteristic of the modules 2, 3 and 4. In comparison with the emission characteristic in FIG. 5B, the narrower, less diffuse emission characteristic of the module 3 in comparison with the emission characteristic of the module 2 is in this case additionally superimposed. Such a compound emission characteristic is suitable, for example, for a poor-weather operating mode of the headlamp, for example for journeys in rain or fog.

Figure 5D:
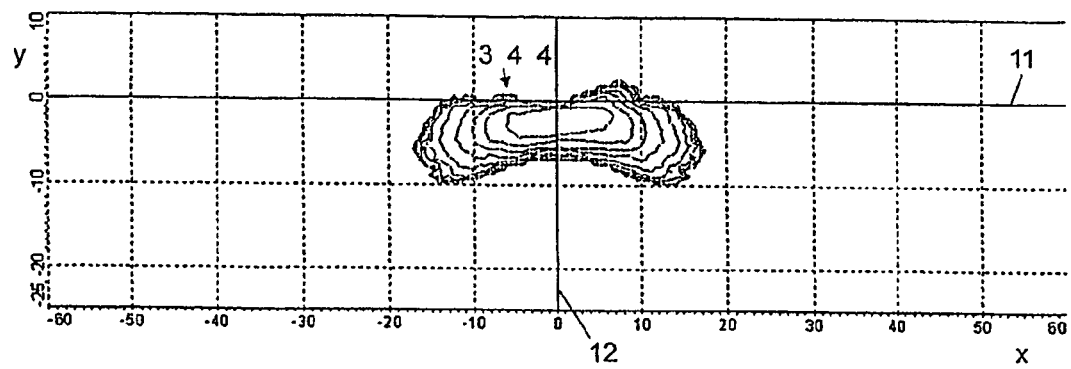
FIG. 5D shows, schematically, the light intensity distribution of a superimposition of the emission characteristics of the modules in accordance with the third exemplary embodiment and two modules in accordance with the fourth exemplary embodiment.

FIG. 5D shows the superimposition of the emission characteristic of the module 3 with the emission characteristics of two modules 4. The emission characteristics of the two modules 4 are in this case each rotated through the angle φ. A particularly concentrated emission characteristic with a maximum light intensity of approximately 55 000 cd on the projection surface results. The combination of the emission characteristics of the modules 3 and 4 can be used, for example, for highway journeys at high speed.

Figure 6A:
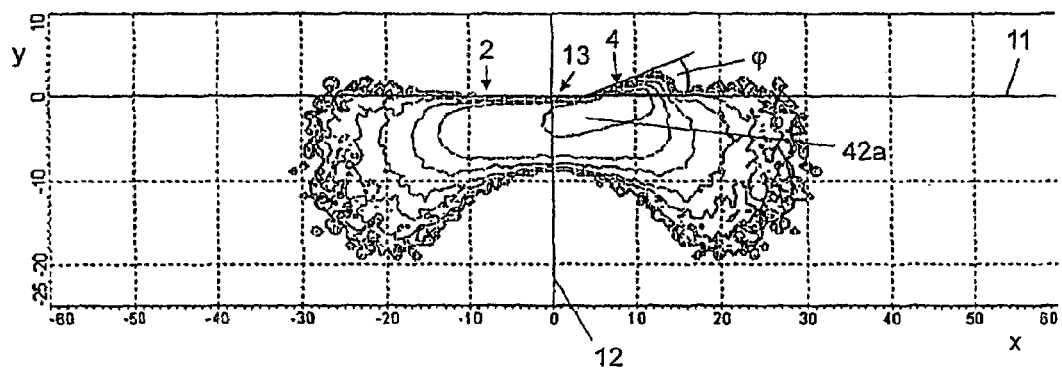
FIGS. 6A and 6B show a schematic light intensity distribution of a superimposition of the emission characteristics of the modules in accordance with the second and fourth exemplary embodiments.
Figure 6B:
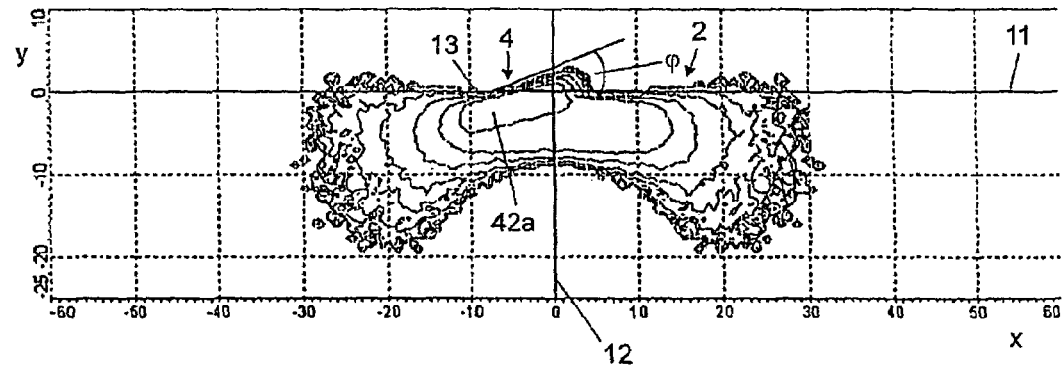

FIGS. 6A and 6B show a superimposition of the emission characteristics of the modules 2 and 4, for example, suitable as a lower beam of the headlamp. The emission characteristic of the module 4 is rotated about the longitudinal axis 31 of the module in both figures, with the result that the light/dark boundary 13 in the projection encloses an angle ϕ with respect to the horizontal. A rotation of the emission characteristic about the vertical axis 32 (cf. in this regard, FIG. 9) is superimposed on the rotation about the longitudinal axis 31. Thus, the emission characteristic of the module 4 in FIG. 6A is rotated through 5° to the right and, in FIG. 68B, through 5° to the left about the vertical axis 32. The rotation of the emission characteristic about the vertical axis 32 can be brought about, for example, by the entire module or the module optical unit being rotated. The angle of rotation is in this case for example matched to the curvature of a curve. In this way, the area with the strongest illumination 42a may follow the curvature of a curve. The rotation of the module takes place, for example, by means of a stepper motor, which is controlled at least indirectly by the steering movement of the vehicle. It is furthermore also possible for the emission characteristic of the module 2 to be rotated about the vertical axis 32 of the module together with the emission characteristic of the module 4, or separately therefrom, and therefore for it to likewise follow the curvature of the curve.

The described rotation of the emission characteristic, for example, of the hot spot module in FIG. 4, about the vertical axis 32 is also possible for other combinations of emission characteristics, as shown, for example, in FIGS. 5A to 5D.

Figure 7A:
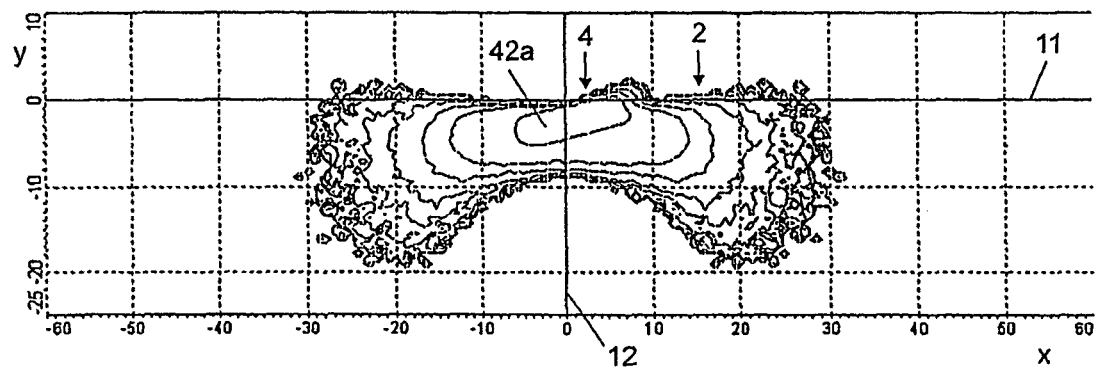
FIGS. 7A and 7B show a schematic light intensity distribution of a superimposition of the emission characteristics of the modules in accordance with the second and fourth exemplary embodiments.
Figure 7B:
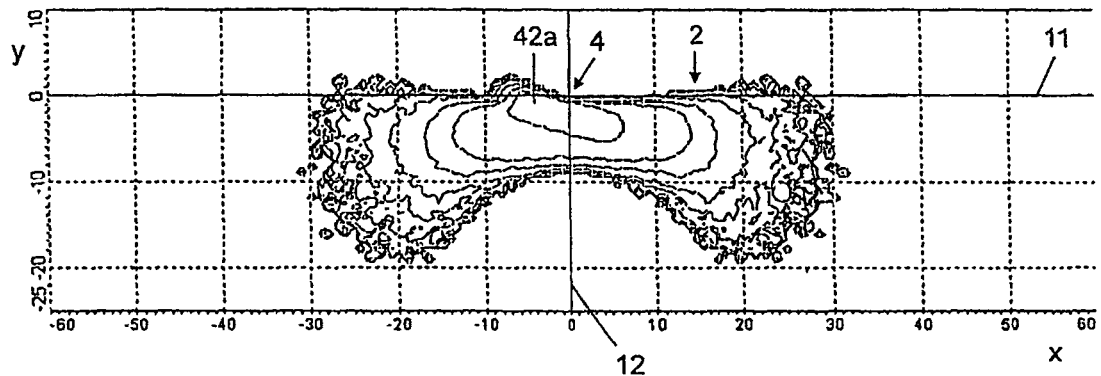

FIGS. 7A and 7B show a rotation of the hot spot module 4 about the longitudinal axis 31 of the module through an angle of +ϕ or −ϕ. Such a rotation of the emission characteristic can be used for switching over from traffic on the right to traffic on the left, and vice versa (so-called "tourist switching" for the change from traffic on the left to traffic on the right, and vice versa). The rotation of the emission characteristic of the hot spot module 4 about the longitudinal axis 31 for the purpose of switching over from traffic on the right to traffic on the left is also possible for further combinations of emission characteristics, as are shown in FIGS. 5A to 5D.

Overall, a large number of combinations of emission characteristics of different modules is possible. Using relatively few different or identical modules and the movement of the emission characteristics of individual or multiple modules, different emission characteristics of a headlamp can be realized. As a result, a large number of different traffic situations and driving conditions can be taken into consideration. The exemplary embodiments of FIGS. 5 to 7 in this case are to be understood by way of example and in no way as being restrictive.

FIGS. 8A and 8B show a possible implementation of the rotation of the emission characteristic of a module about its longitudinal axis 31. For example, in order to switch over from traffic on the right to traffic on the left, as shown in FIGS. 7A and 7B, a lever system with a lever 10 can be used. The rotation of a module about its longitudinal axis 31 then takes place by means of mechanical actuation of the lever. The mechanical actuation of the lever 10 brings about, by means of the lever arms 10a, 10b, a rotation of the module 4, for example, about its longitudinal axis 31. The angle of rotation can be adjusted continuously. However, it is also possible for the module to be capable of being rotated about preset angles by actuation of the lever 10.

FIG. 9 shows a schematic, perspective diagram of a module for light generation 70. The module 70 contains a light source 20 and a module optical unit 21, which is arranged downstream of the light source 20. The module 70 is mounted such that it is capable of rotating, for example, about three main axes 31, 32, 33, which run at right angles to one another and intersect one another, for example, at the center of gravity 70a of the module 70. The longitudinal axis 31 preferably runs parallel to the main emission direction of the module. When the module has not been rotated, the longitudinal axis 31 particularly preferably runs parallel to an optical axis 61 of a projection lens, which is arranged downstream of the module (cf. in this regard FIG. 13). The vertical axis 32 and the horizontal axis 33 are each at right angles to the longitudinal axis 31.

A rotation of the module about the longitudinal axis 31 causes the emission characteristic of the module 70 to pivot, as is shown for the hot spot module 4, for example, in FIGS. 4B and 4C. A rotation about the vertical axis 32 causes the rotation illustrated in FIGS. 6A and 6B, by way of example for the hot spot module 4, and this rotation is suitable, for example, for following the emission characteristic when traveling around bends. A rotation about the transverse axis 33 of the module 70 appears in projection as a tipping of the emission characteristic downwards, for example towards a roadway, or upwards, for example away from a roadway. Owing to the rotation about the transverse axis 33 of the module, it is therefore possible to respond to the inclination of the vehicle. If the vehicle is inclined for example at its front towards the roadway, the emission characteristic of the module can be guided away from the roadway by rotation about the transverse axis 33, with the result that the main emission direction of the module 70 extends, for example, substantially parallel to the roadway.

Figure 10A:
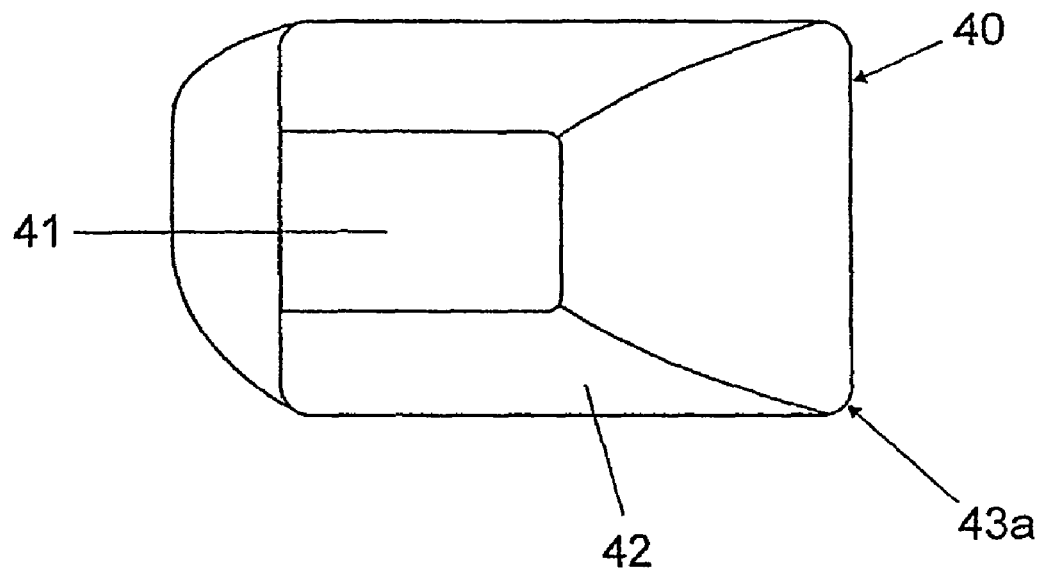
FIG. 10A shows a schematic, perspective diagram of a first exemplary embodiment of a module optical unit.
Figure 10B:
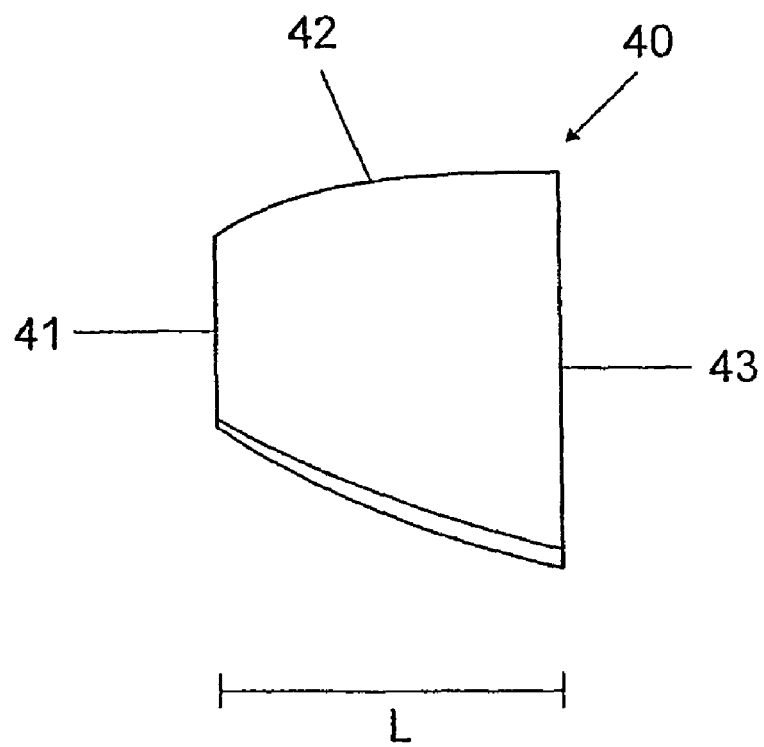
FIG. 10B shows a schematic, sectional illustration of the first exemplary embodiment of a module optical unit.

FIG. 10A shows a schematic, perspective diagram of an exemplary embodiment of a module optical unit 40, as can be used, for example, for a hot spot module 4. FIG. 10B shows the associated schematic side view in a sectional illustration.

The module optical unit 40 shown is a reflector having a length of approximately 5 mm, which can be arranged downstream of the light source 20 as the module optical unit 21 (cf. FIG. 9). The reflector 40 has a light entry opening 41, a light exit opening 43 and side surfaces 42, which connect the light entry opening 41 to the light exit opening 42.

The light entry opening 41 in this case has a smaller area than the light exit opening 42.

The side surfaces 42 are designed to be reflective. For example, the side surfaces 42 are, for this purpose, coated reflectively in the interior of the reflector 40. However, it is also possible for the reflector 4 to be in the form of a solid body, which contains, for example, a transparent plastic material. Reflections on the side surfaces 42 then take place owing to total reflection. The side surfaces 42 are in the form of a CPC, CEC, CHC, truncated-pyramid or truncated-cone optical unit, at least in places, as described in the general part of the description. It is possible further for the side surfaces to contain 42 freeform surfaces, which may have higher-order curvatures.

The side surfaces 42, the light entry openings 41 and the light exit openings 42 are shaped in such a way that a desired emission characteristic of the module results. The light distribution at the light exit opening 43 is in this case substantially determined by the shape of the side surfaces 42. The contours of the light distribution are substantially determined by the shape of the border 43a of the light exit opening 43. The light distribution at the light exit opening 43 is projected, for example, by means of a projection lens 60 (cf. FIG. 13). The projection onto a planar surface results in light intensity distributions as illustrated, for example, in FIGS. 1 to 7.

Figure 11A:
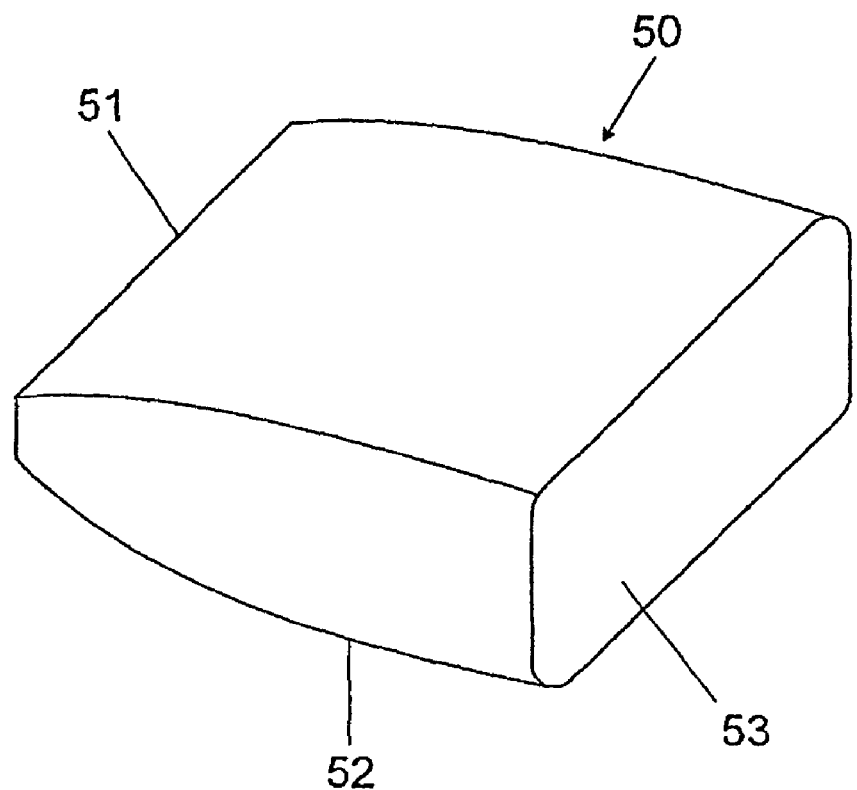
FIG. 11A shows a schematic, perspective diagram of a second exemplary embodiment of a module optical unit.
Figure 11B:
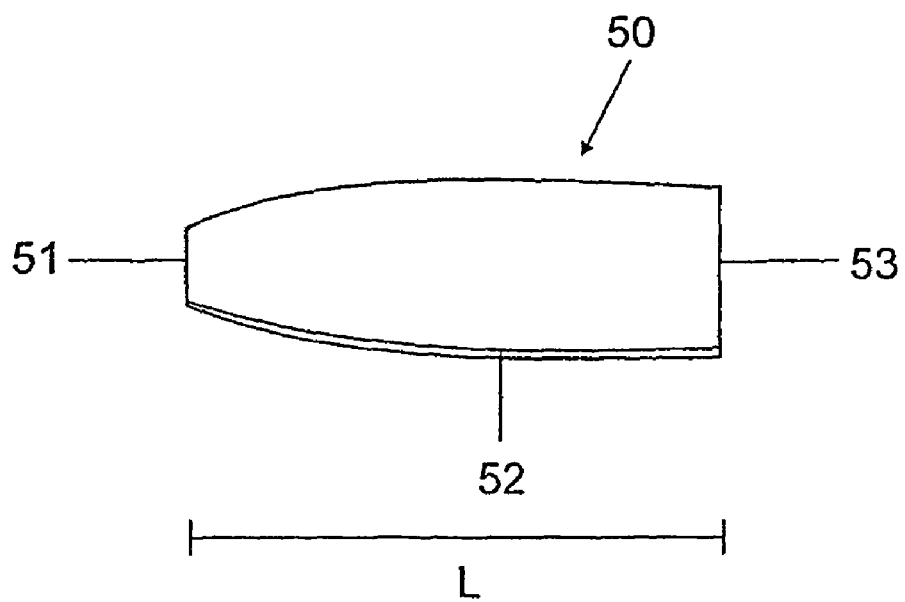
FIG. 11B shows a schematic, sectional illustration of the second exemplary embodiment of a module optical unit.

FIG. 11a shows a schematic, perspective diagram of a second exemplary embodiment of a module optical unit 50. FIG. 11B shows the associated side view in a sectional illustration. The module optical unit 50 illustrated can be used, for example, for generating a light intensity distribution as is illustrated in FIGS. 1 to 3. The length L of the module optical unit is approximately 15 mm. For example, the module optical unit 50 is in the form of a solid body. For example, the module optical unit 50 contains, for this purpose, a transparent plastic material. The module optical unit 50 has a light entry surface 51 having a smaller area than the light exit surfaces 53. Side surfaces 52 connect the light entry surface 51 and the light exit surface 52. Light is guided in the module optical unit 50 by means of total reflection to the side surfaces 52 from the light entry opening 51 to the light exit opening 53. However, it is also possible for the module optical unit 50 not to be in the form of a solid body but for the side surfaces 52 to be designed to be reflective in the interior of the module optical unit 50, for example, to be coated so as to be reflective.

As was already the case in the exemplary embodiment in FIGS. 10A and 10B, a predetermined light distribution on the light exit surface 53 can be generated substantially by the reflections on correspondingly designed side surfaces 52. The side surfaces 52 are shaped, for this purpose, at least in places, in the form of a CPC, CHC, CEC, truncated-pyramid or truncated-cone optical unit. It is further possible for the side surfaces 52 to have regions with higher-order curvatures.

In the exemplary embodiments in FIGS. 10A, 10B and 11A, 11B, it is also possible for the light exit surface to have a defined curvature. For example, the light exit opening can have a convex curvature. The curvature of the light exit surface may in this case be selected such that parts of the light exit surface lie in the focal plane 63 of a projection lens 60 (cf. FIG. 13), whereas other regions of the light exit surface do not lie in the focal plane 63. This makes it possible to achieve a situation in which the light/dark transition 13 (cf., for example, FIG. 1) lies in the focal plane 63. It is in this case also possible for the focal plane 63 not to be planar, as illustrated in simplified form in FIG. 13, but for the focal plane 63 to have a curvature. For example, the focal plane 63 is curved convexly towards the lens 60. This allows for particularly sharp imaging of the light/dark transition 13. Regions of the light distribution on the light exit surface which do not lie in the focal plane 63 then appear with a softer transition in the projection.

Figure 12A:
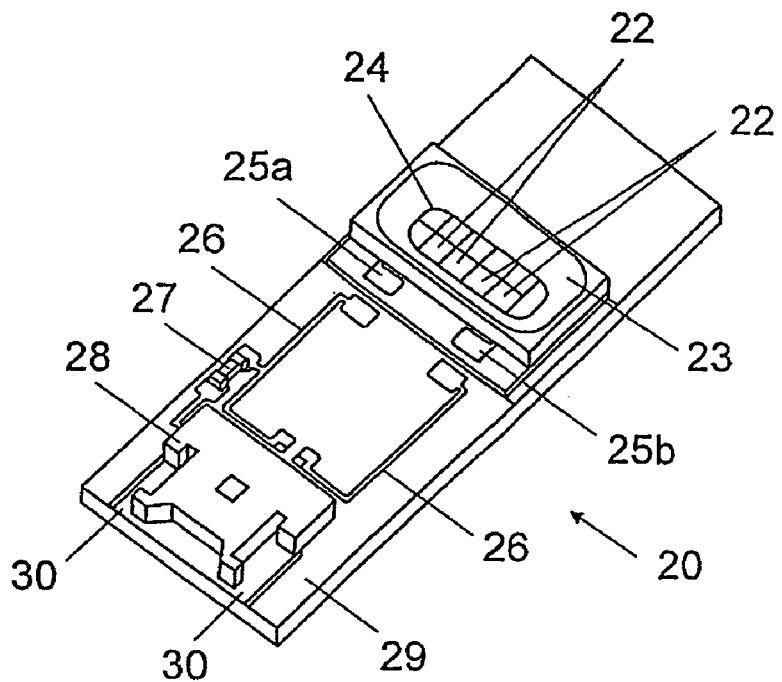
FIG. 12A shows a schematic, perspective diagram of an exemplary embodiment of the light source of the module.
Figure 12B:
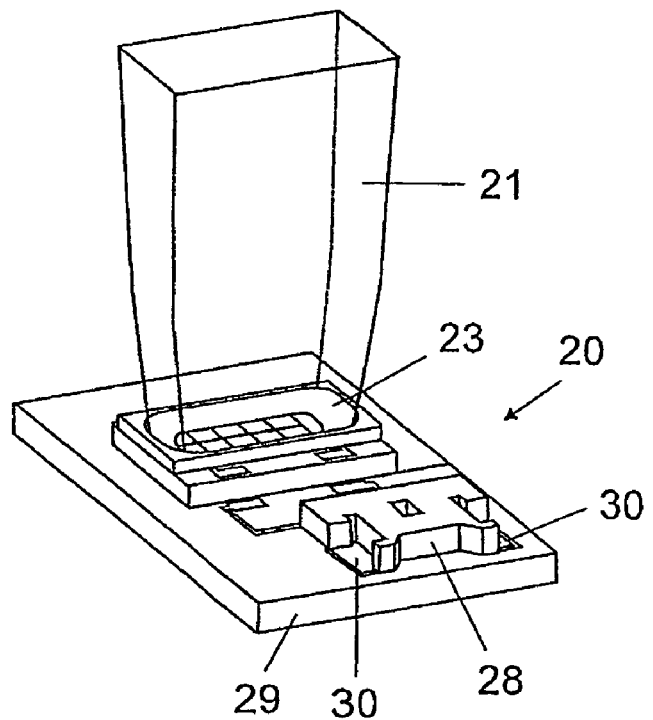
FIG. 12B shows a schematic, perspective diagram of the exemplary embodiment of the light source of the module with the module optical unit.

FIG. 12A shows a schematic, perspective diagram of an exemplary embodiment of the light source 20. FIG. 12B shows the light source 20 with the module optical units 21.

The light source 20 comprises, for example, five light-emitting diode chips 22. The light-emitting diode chips 22 are, for example, thin-film light-emitting diode chips 22 having a luminous efficiency of in each case at least 20 lumens per watt. Preferably, the light-emitting diode chips 22 are suitable for generating light in the blue spectral range. A luminescence conversion material is arranged downstream of the light-emitting diode chips 22. The frequency-converted proportion of the radiation emitted by the light-emitting diode chips 22 is mixed with the non-converted proportion, preferably to form white light.

The light-emitting diode chips 22 are arranged, for example, on the base 24 of a housing 23. The housing 23 may be formed, for example, from a ceramic material. Preferably, the housing 23 has inner walls, which are designed, at least in places, to be reflective.

The inner walls of the housing 23 can be shaped, for example, in the form of a non-imaging optical concentrator, through which radiation passes in the opposite direction, which results in a collimation of the radiation emitted by the light-emitting diode chip 22. In the main emission direction of the light-emitting diode chip 22, a module optical unit 21 can be arranged downstream of the inner walls of the housing 23, as is described further above (see in this regard FIGS. 10 and 11).

Contact is made with the light-emitting diode chips 22 at the contact pads 25a and 25b outside the housing 23. Conductor tracks 26 connect the contact pads 25a, 25b to connection points 30, via which contact can be made with the light source 20 from the outside. For example, the connection of the light source to the power supply system of a motor vehicle can take place by means of a plug on the mating plug 28. At least one varistor 27 acts as overvoltage protection means for the light source 20. The mating plug 28, the varistor 27 and the housing 23 are arranged, for example, on a metal core board 29, which acts both as a printed circuit board and as a heat-conducting element for the heat produced during operation of the light-emitting diode chips 22.

In this case, it is possible for an apparatus for dimming the light-emitting diode chips 22 to be provided on the metal core board 29 or outside the light source 20. In this way, the emission characteristic of the module additionally can be matched to external conditions such as weather or lighting conditions by means of a change in the intensity. Furthermore, a change in the intensity of the light emitted by the light source 20 is also possible by means of targeted connection and disconnection of individual light-emitting diode chips 22.

Figure 13:
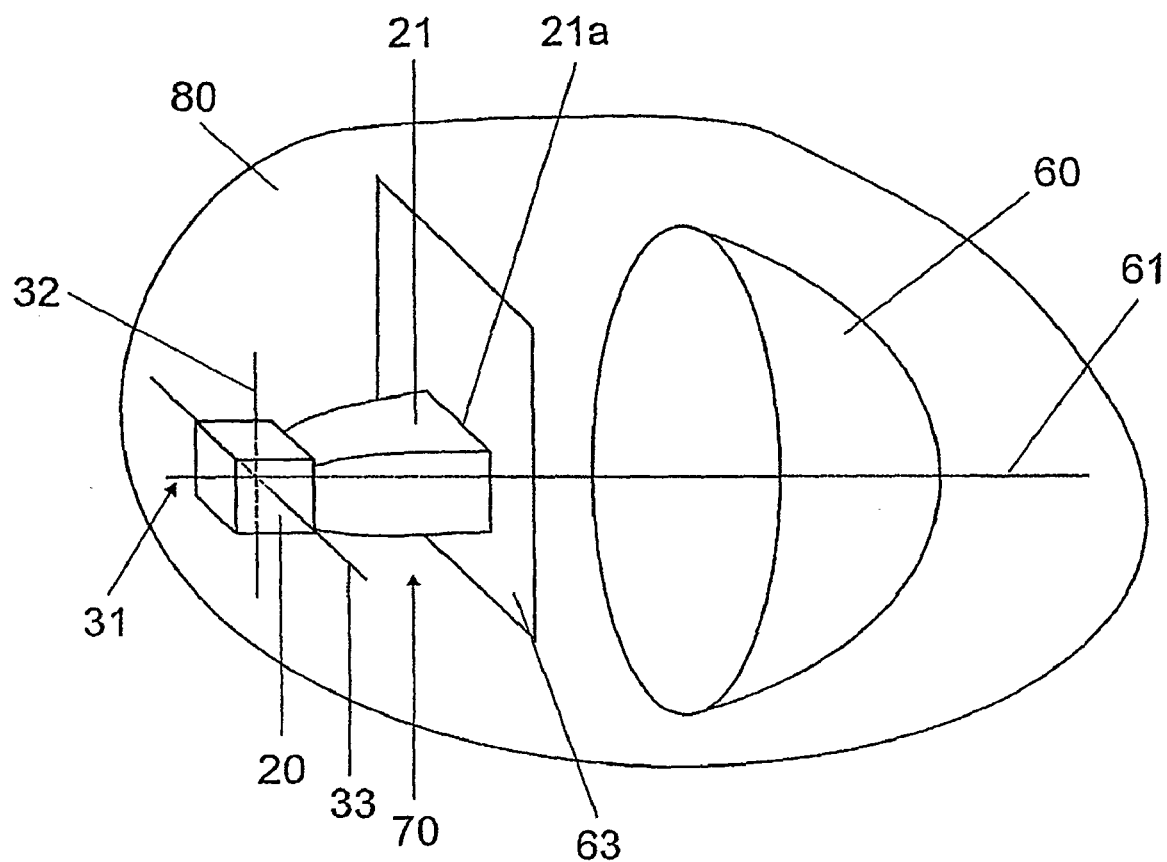
FIG. 13 shows a schematic, perspective diagram of a headlamp with the module and the optical element.

FIG. 13 shows a schematic, perspective diagram of a headlamp 80 having a module 70 and a projection lens 60. In the non-rotated state, the module 70 is preferably arranged with respect to the projection lens 60 in such a way that the longitudinal axis 31 of the module runs parallel to the optical axis 61, and at least parts of the radiation exit surface 21a of the module optical unit 21 are arranged in the focal plane 63 of the projection lens 60.

The emission characteristic of the module 70 is capable of moving in a reference system which is associated with the headlamp 80. This can take place, for example, by means of a movement of the module 70 in relation to the headlamp 80. By changing the distance between the radiation exit surface 21a and the focal plane 63 of the projection lens 60, a sharp-focusing or soft-focusing of the projection of the emission characteristic of the module 70 or at least part of the projection of the emission characteristic is additionally possible for example by means of movement of the module 70 along one of the main axes 31, 32, 33.

The invention is not restricted by the description using the exemplary embodiments. Instead, the invention includes any novel feature and any combination of features which in particular includes any combination of features in the patent claims, even if this feature or this combination itself is not explicitly cited in the patent claims or exemplary embodiments. For example, in the motor vehicle headlamp according to the invention, a module 70 which is arranged such that it can move in a reference system associated with the headlamp can also be used to generate a so-called cornering light. For example, for this purpose the three-dimensional position or alignment of this module 70 with respect to the abovementioned reference system can be changed corresponding to the angle of lock of the steering wheel when traveling through bends and when turning the vehicle.

In addition, the use of the described headlamp is not restricted to motor vehicles. Instead, a large number of use possibilities, for example, in aircraft or else as stationary headlamps, is provided.

The invention claimed is:

1. A motor vehicle headlamp, having at least two modules for light generation, an emission characteristic of at least one of the at least two modules being capable of moving in a reference system associated with the headlamp,
    wherein emission characteristics of the at least two modules are superimposed to give an emission characteristic of the headlamp;
    wherein each of the at least two modules has a light source and a module optical unit, said light source containing at least one light-emitting diode chip, said module optical unit being formed, at least in places, as at least one of the following optical elements: CPC, CEC, CHC, truncated-pyramid optical unit, and truncated-cone optical unit;
    wherein said module optical unit is in the form of one of a reflector and a solid body, the reflector having a light entry opening, a light exit opening, and side surfaces connecting the light entry opening to the light exit opening, the solid body having a light entry surface, a light exit surface, and side surfaces connecting the light entry surface to the light exit surface; and
    wherein at least one of said light entry opening and said light entry surface in an associated one of the at least two modules is a maximum of twice as large as a total radiation output surface of the at least one light-emitting diode chip of the associated one of the at least two modules.

2. The motor vehicle headlamp as claimed in claim 1, in which the at least two modules of the headlamp have different emission characteristics.

3. The motor vehicle headlamp as claimed in claim 1, in which at least part of one of the at least two modules is capable of moving in the reference system associated with the headlamp.

4. The motor vehicle headlamp as claimed in claim 1, in which the at least one of the at least two modules is mounted to be capable of rotating.

5. The motor vehicle headlamp as claimed in claim 1, in which the at least one of the at least two modules is mounted to be capable of rotating about three associated main axes.

6. The motor vehicle headlamp as claimed in claim 1, in which the module optical unit is mounted such that it is capable of rotating.

7. The motor vehicle headlamp as claimed in claim 1, in which a position of the light source is changeable in relation to the module optical unit.

8. The motor vehicle headlamp as claimed in claim 1, having a stepper motor.

9. The motor vehicle headlamp as claimed in claim 1, having a lever system.

10. The motor vehicle headlamp as claimed in claim 1, having an optical element, which is arranged downstream of the at least two modules.

11. The motor vehicle headlamp as claimed in claim 10, in which the optical element comprises a projection lens.

12. The motor vehicle headlamp as claimed in claim 10, in which a position of at least one of the at least two modules is changeable in relation to the optical element.

* * * * *